(12) United States Patent
Li et al.

(10) Patent No.: US 10,909,170 B2
(45) Date of Patent: Feb. 2, 2021

(54) METHOD FOR PROCESSING AND RENDERING FEED-LIKE BASED IMAGES FOR MOBILE DEVICES

(71) Applicant: Baidu USA LLC, Sunnyvale, CA (US)

(72) Inventors: Liyun Li, Sunnyvale, CA (US); Jiangtao Hu, Sunnyvale, CA (US); Guang Yang, Sunnyvale, CA (US); Dong Li, Sunnyvale, CA (US); Jingao Wang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 853 days.

(21) Appl. No.: 15/091,862

(22) Filed: Apr. 6, 2016

(65) Prior Publication Data

US 2017/0293616 A1 Oct. 12, 2017

(51) Int. Cl.
*G06F 16/58* (2019.01)
*G06F 16/957* (2019.01)

(52) U.S. Cl.
CPC ...... *G06F 16/5866* (2019.01); *G06F 16/9577* (2019.01)

(58) Field of Classification Search
CPC .............. G06F 16/5866; G06F 16/538; G06F 16/9574; G06F 16/9577; G06F 16/9535; G06F 16/54
See application file for complete search history.

(56) References Cited

U.S. PATENT DOCUMENTS

| | | | | |
|---|---|---|---|---|
| 7,426,696 | B1* | 9/2008 | Hwang | H04N 5/44543 348/E5.105 |
| 9,414,222 | B1* | 8/2016 | Dixon | H04L 67/22 |
| 10,261,938 | B1* | 4/2019 | Jenkins | G06F 15/167 |
| 2007/0174790 | A1* | 7/2007 | Jing | G06F 3/0482 715/838 |
| 2008/0183672 | A1* | 7/2008 | Canon | G06F 16/9577 |
| 2008/0222242 | A1* | 9/2008 | Weiss | H04L 67/2847 709/203 |
| 2010/0174735 | A1* | 7/2010 | Fiatal | G06F 16/9574 707/769 |
| 2011/0264641 | A1 | 10/2011 | Yang et al. | |

(Continued)

FOREIGN PATENT DOCUMENTS

CN 101042705 9/2007
CN 101231636 7/2008
(Continued)

*Primary Examiner* — Jesse P Frumkin
(74) *Attorney, Agent, or Firm* — Womble Bond Dickinson (US) LLP

(57) ABSTRACT

According to one embodiment, a first image identifier (ID) is received identifying a first of a first set of images, where the first image is currently displayed at a mobile device of a user. A number of additional images the user likely accesses from the first image in sequence is determined based on user interactions of a current browsing session and user interactions of a prior browsing session associated with the user. A second set of images are identified based on the number of additional images the user likely accesses. A sequential order is determined based on rankings of the images in the second set in view of a set of image selection rules. The second set of images is transmitted to the mobile device to be displayed on the mobile device in sequence one at a time.

26 Claims, 10 Drawing Sheets

(56) References Cited

U.S. PATENT DOCUMENTS

| | | | | |
|---|---|---|---|---|
| 2012/0124036 | A1* | 5/2012 | Ramos | G06F 16/24578 |
| | | | | 707/723 |
| 2015/0066907 | A1* | 3/2015 | Somaiya | G06F 3/0485 |
| | | | | 707/722 |
| 2015/0161176 | A1 | 6/2015 | Majkowska et al. | |
| 2015/0278358 | A1* | 10/2015 | Abib | G06F 16/951 |
| | | | | 707/706 |
| 2017/0039322 | A1* | 2/2017 | Reicher | G06F 3/04845 |
| 2017/0076210 | A1* | 3/2017 | Xu | H04L 67/42 |
| 2017/0235441 | A1* | 8/2017 | Rose | H04N 1/00198 |
| | | | | 715/732 |
| 2019/0236647 | A1* | 8/2019 | Geetha | G06Q 30/0256 |

FOREIGN PATENT DOCUMENTS

| | | |
|---|---|---|
| CN | 102298612 | 12/2011 |
| CN | 105518655 | 4/2016 |

\* cited by examiner

| Rule ID | Description |
|---|---|
| Rule 1 501 | <content_type_1> : <content item_1> RENDER_TO <position_start> |
| Rule 2 502 | <content_type_2> : <content item_1> RENDER_TO <position_end> |
| Rule 3 503 | SELECT <content> FROM <content_type_1> FILTERED_BY <time>, <score_1>, SORT_BY <score_2>, SELECT <content> FROM <content_type_2> FILTERED_BY <time>, <score_1>, SORT_BY <score_2>, SELECT <content> FROM <content_type_3> FILTERED_BY <time>, <score_1>, SORT_BY <score_2>, SORT_BY <score_3> AND RENDER_TO <position_start+1>, <position_start+2>, ... <position_end-1> |
| ... | ... |

FIG. 5

METHOD FOR PROCESSING AND
RENDERING FEED-LIKE BASED IMAGES
FOR MOBILE DEVICES

FIELD OF THE INVENTION

Embodiments of the present invention relate generally to search image content. More particularly, embodiments of the invention relate to rendering feed-like based images to be browsed by mobile devices.

BACKGROUND

Most search engines typically perform searching of Web pages during their operation from a browser running on a client device. A search engine receives a search term entered by a user and retrieves a search result list of Web pages associated with the search term. The search engine displays the search results as a series of subsets of a search list based on certain criteria. General criteria that is used during a search operation is whether the search term appears fully or partly on a given webpage, the number of times the search string appears in the search result, alphabetical order, etc. Further, the user can decide to open a link by clicking on the mouse button to open and browse. Some of the user interactions with the search results and/or user information may be monitored and collected by the search engine to provide better searches subsequently.

Typically, in response to a search query, a search is performed to identify and retrieve a list of content items. The content items are then returned to a search requester. One of the most popular searching is searching images, particularly from a mobile device. When a list of images are identified in response to a search query received from a mobile device, an image result page having the list of images is transmitted to the mobile device. The images in the image result page are represented by image representations such as thumbnails. When a user interacts with the image result page, for example, by clicking one of the image representations, the user enters an image detail page in which the full or enlarged versions of the images are displayed. Due to the limited display of a mobile device, typically, the images of the detail page are displayed in sequence one at a time. The user can swipe from right to left or vice versa to access the next image or previous image.

Conventional image searches typically result in a static amount of images in response to a search query. Subsequent images may be retrieved from the result list and displayed in response to the user interaction, where the amount of images that can be browsed in a current browsing session is limited to the number of images in the result page. In addition, in order to improve the user experience of image browsing, some systems prefetch some of the images in the result page. However, due to the limited resources (e.g., memory) of a mobile device, it is impractical to prefetch all of the images. Further, it is difficult to know how many images the user likely browses and prefetching too many images may result in wasting network bandwidth and processing resources of the mobile device.

BRIEF DESCRIPTION OF THE DRAWINGS

Embodiments of the invention are illustrated by way of example and not limitation in the figures of the accompanying drawings in which like references indicate similar elements.

FIG. 5 is a block diagram illustrating an example of image selection rules according to one embodiment of the invention.

DETAILED DESCRIPTION

Figure 1A:
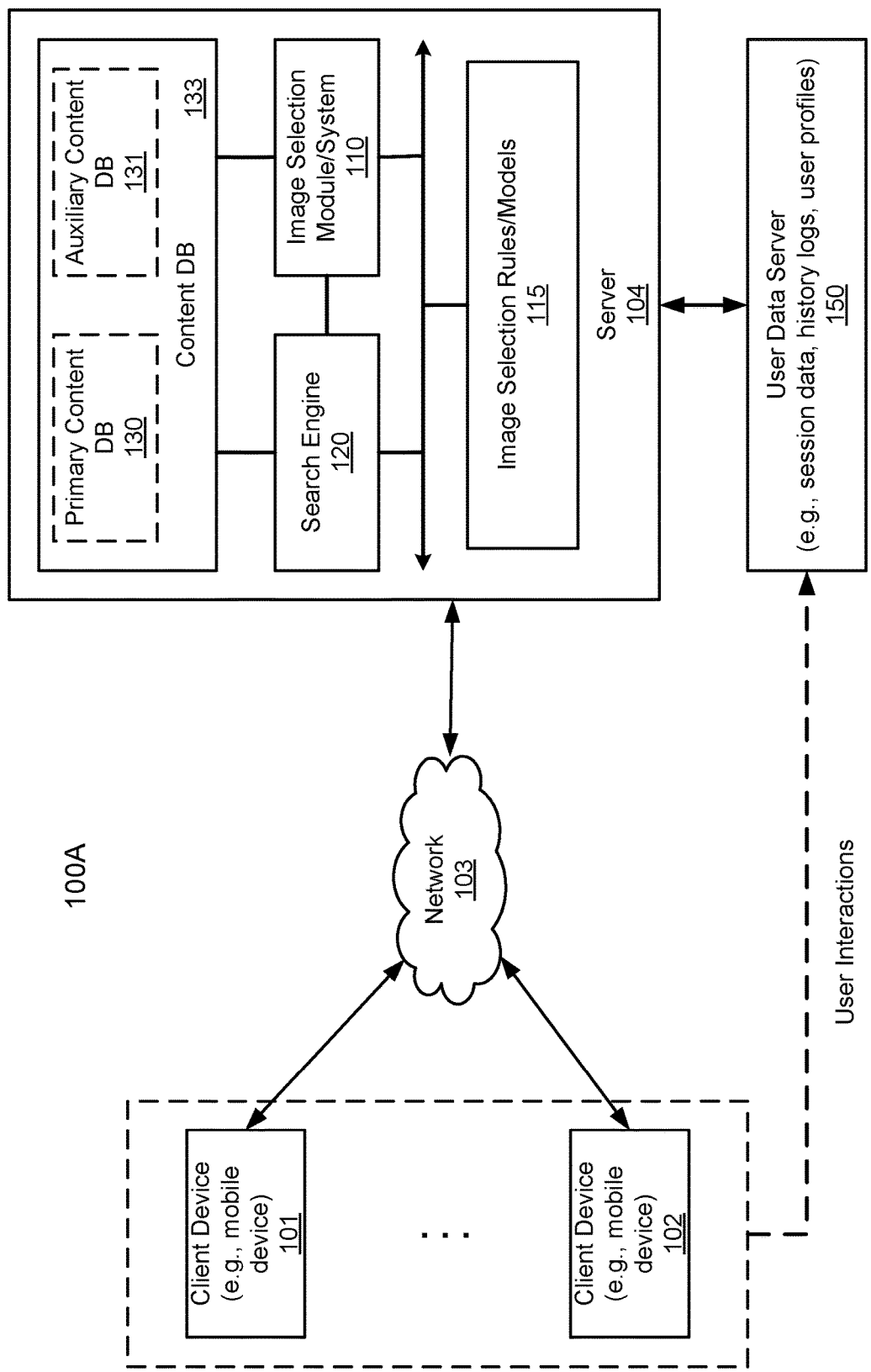
FIGS. 1A and 1B are block diagram illustrating an example of system configuration for searching images according to some embodiments of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, an image selection system is utilized to search, select, and render images to be browsed by a user in an image detail page in a feed based or feed-like based manner. In one embodiment, instead of obtaining and sending a static amount of images to a mobile device of a user, only a small predetermined amount of images are rendered and transmitted to the mobile device of the user. Subsequent images may be dynamically searched, selected, and rendered dependent upon the user behavior and user interactions of the images that have been rendered and sent to the mobile device. The subsequent images may be searched, selected, and rendered based on user behavior or interactions with the images presented during a current browsing session, as well as prior user behavior or interactions on images during prior browsing sessions. The amount of subsequent images to be processed depends upon the user behavior or interactions of the current browsing session, such as, for example, which image the user is currently viewing, the speed the user browse through the images (e.g., how fast the use swipes), and/or how much time the user stays and views a particular image, etc.

According to one embodiment, in addition to the general images (also referred to as general-purpose images or primary images, which are searched and found in a primary content database or image sources), auxiliary images (also referred to as secondary images or special-purpose images) may also be identified that may be related to the general images. The auxiliary images may be provided by one or more special image providers. The auxiliary images may be integrated or mixed with the primary images to form an integrated list or integrated stream of images to be browsed at the mobile device of the user. In one embodiment, the auxiliary images may be inserted at certain positions or locations between some of the primary images, i.e., intertwined with the primary images in sequence. The auxiliary images may be ranked and inserted at certain intertwined or placement positions between the primary images to form the integrated stream of mixed images. The intertwined positions may be determined based on a set of rules and/or one or more ranking modules dynamically at runtime. The set of rules may statically specify certain positions for certain types of images with certain rankings. The rankings of the images may be determined using one or more ranking models. The remaining images' positions may be dynamically determined using the ranking models. The set of rules may be statically compiled for all users, while the ranking models may be constructed for specific users, for example, trained based on the specific users' prior interaction history.

In one aspect of the invention, a first image identifier (ID) is received identifying a first of a first set of images, where the first image is currently displayed at a mobile device of a user. A number of additional images the user likely accesses from the first image in sequence is determined based on user interactions within a current browsing session and user interactions of a prior browsing session associated with the user. A second set of images are identified based on the number of additional images the user likely accesses. A sequential order is determined based on rankings of the images in the second set in view of a set of image selection rules. The second set of images is transmitted to the mobile device to be displayed on the mobile device in sequence one at a time.

In another aspect of the invention, a first image identifier (ID) identifying a first primary image currently being displayed on a mobile device of a user. The first primary image is one of the primary images that are identified in response to a search query. An image selection system determines a number of additional images the user likely accesses from the first primary image based on the user interactions within a current browsing session and prior browsing sessions associated with the user. The image selection system mixes one or more auxiliary images with at least some of the primary images in sequence at different sequential positions amongst the primary images. An integrated list of images is generated, where the integrated list includes the auxiliary images and the primary images intertwined therein. The integrated list of images is then transmitted to the mobile device, where the images of the integrated list are displayed in sequence one at a time.

Figure 1B:
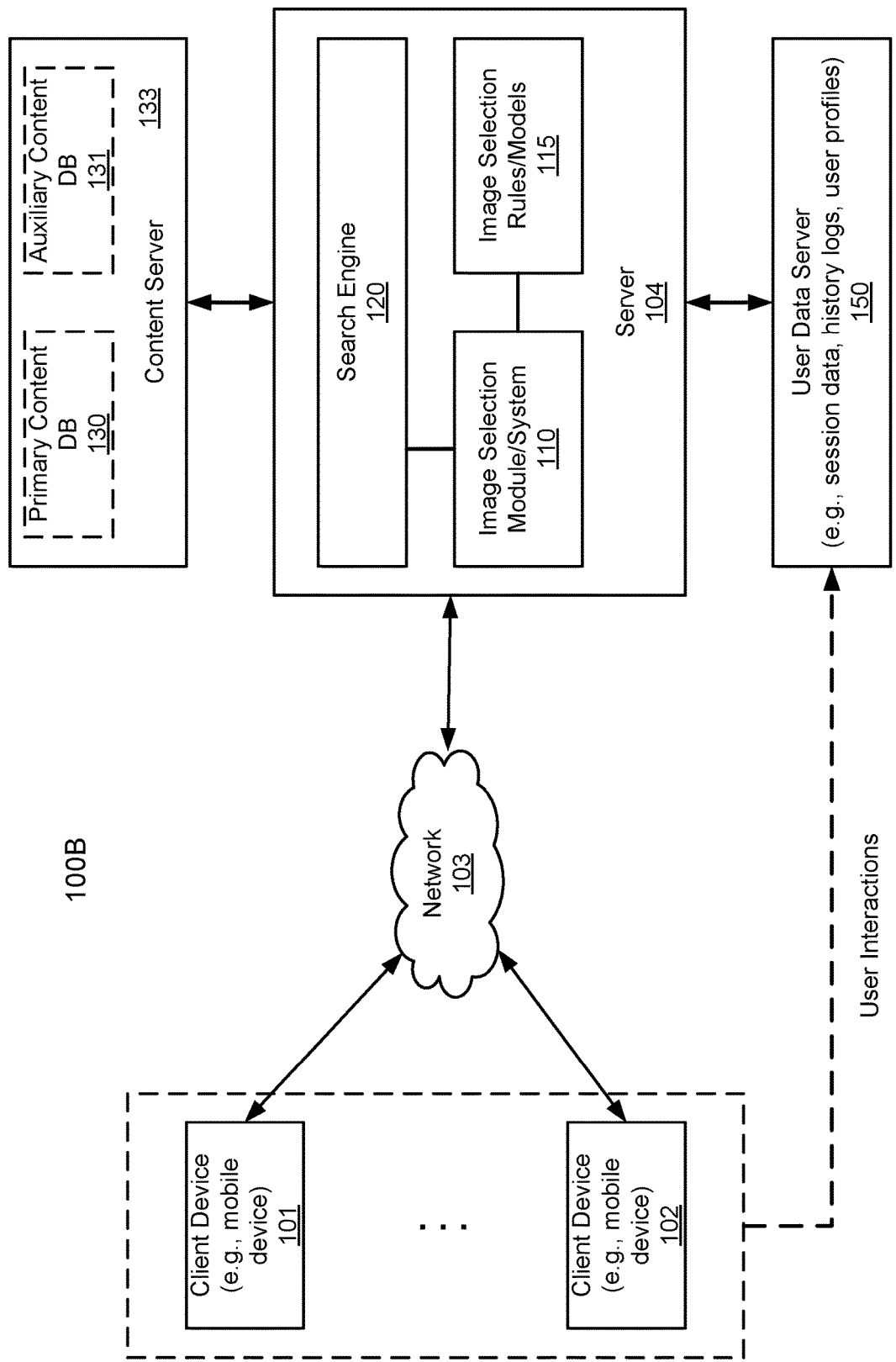

FIGS. 1A and 1B are block diagram illustrating an example of system 100A, 100B configuration for searching images according to some embodiments of the invention. Referring to FIG. 1A, system 100A includes, but is not limited to, one or more client devices 101-102 communicatively coupled to server 104 over network 103. Client devices 101-102 may be any type of client devices such as a personal computer (e.g., desktops, laptops, and tablets), a "thin" client, a personal digital assistant (PDA), a Web enabled appliance, a Smartwatch, or a mobile phone (e.g., Smartphone), etc. Network 103 may be any type of networks such as a local area network (LAN), a wide area network (WAN) such as the Internet, or a combination thereof, wired or wireless.

Server 104 may be any kind of servers or clusters of servers, such as Web or cloud servers, application servers, backend servers, or a combination thereof. In one embodiment, server 104 includes, but is not limited to, search engine 120, image selection module or system 110, and image selection rules or models 115. Server 104 further includes an interface (not shown) to allow a client such as client devices 101-102 to access resources or services provided by server 104. The interface may include a Web interface, an application programming interface (API), and/or a command line interface (CLI).

For example, a client, in this example, a user application of client device 101 (e.g., Web browser, mobile application), may send a search query to server 104 and the search query is received by search engine 120 via the interface over network 103. In response to the search query, search engine 120 extracts one or more keywords (also referred to as search terms) from the search query. Search engine 120 performs a search in content database 133, which may include primary content database 130 and/or auxiliary content database 131, to identify a list of content items that are related to the keywords. Primary content database 130 (also referred to as a master content database) may be a general content database, while auxiliary content database 131 (also referred to as a secondary content database) may be a special content database. Search engine 120 returns a search result page having at least some of the content items in the list to client device 101 to be presented therein. Search engine 120 may be a Baidu® search engine available from Baidu, Inc. or alternatively, search engine 120 may represent a Google® search engine, a Microsoft Bing™ search engine, a Yahoo® search engine, or some other search engines.

A search engine, such as a Web search engine, is a software system that is designed to search for information on the World Wide Web. The search results are generally presented in a line of results often referred to as search engine results pages. The information may be a mix of Web pages, images, and other types of files. Some search engines also mine data available in databases or open directories. Unlike web directories, which are maintained only by human editors, search engines also maintain real-time information by running an algorithm on a web crawler.

Web search engines work by storing information about many web pages, which they retrieve from the hypertext markup language (HTML) markup of the pages. These pages are retrieved by a Web crawler, which is an automated Web crawler which follows every link on the site. The search engine then analyzes the contents of each page to determine how it should be indexed (for example, words can be extracted from the titles, page content, headings, or special fields called meta tags). Data about web pages are stored in an index database for use in later queries. The index helps find information relating to the query as quickly as possible.

When a user enters a query into a search engine (typically by using keywords), the engine examines its index and provides a listing of best-matching web pages according to its criteria, usually with a short summary containing the document's title and sometimes parts of the text. The index is built from the information stored with the data and the method by which the information is indexed. The search engine looks for the words or phrases exactly as entered. Some search engines provide an advanced feature called proximity search, which allows users to define the distance between keywords. There is also concept-based searching where the research involves using statistical analysis on pages containing the words or phrases you search for. As well, natural language queries allow the user to type a question in the same form one would ask it to a human.

The usefulness of a search engine depends on the relevance of the result set it gives back. While there may be millions of web pages that include a particular word or phrase, some pages may be more relevant, popular, or authoritative than others. Most search engines employ methods to rank the results to provide the "best" results first. How a search engine decides which pages are the best matches, and what order the results should be shown in, varies widely from one engine to another.

Referring back to FIG. 1A, according to one embodiment, in response to a search query received at server 104 from a client device, in this example, client device 101, search engine 120 performs a search in content database 133, such as primary content database 130 and/or auxiliary content database 131, to generate a list of content items (referred to as first content items). Each of the content items may be associated with a particular Web page of a particular Web site of a particular content provider via a uniform resource link (URL) and/or a uniform resource identifier (URI). In one embodiment, primary content database 130 stores general content items that have been collected by network crawlers (e.g., unsponsored content). Auxiliary content database 135 stores specific or special content items that are associated with specific, known, or predetermined content providers (e.g., sponsored content). Alternatively, content database 133 may be implemented as a single database without distinguishing primary content database 131 from auxiliary content database 132.

Network crawlers or Web crawlers are programs that automatically traverse the network's hypertext structure. In practice, the network crawlers may run on separate computers or servers, each of which is configured to execute one or more processes or threads that download documents from URLs. The network crawlers receive the assigned URLs and download the documents at those URLs. The network crawlers may also retrieve documents that are referenced by the retrieved documents to be processed by a content processing system (not shown) and/or search engine 120. Network crawlers can use various protocols to download pages associated with URLs, such as hypertext transport protocol (HTTP) and file transfer protocol (FTP).

In the field of image searching, content database 133 may be an image database, in which primary content database 130 stores primary images (e.g., general-purpose images) and auxiliary content database 131 stores auxiliary images (e.g., special-purpose images, sponsored images). In response to a search query for searching images, for example, received from a client, such as client device 102, search engine 120 searches in primary content database 130 (e.g., primary image store) to identifying a list of primary images based on one or more keywords associated with the search query. The keywords may be extracted from the search query. Alternatively, the keywords may further include additional keyword(s) that are semantically related to the original keywords obtained from the search query, which may be identified via a latent semantic analysis.

Search engine 120 generates a search result page having a list of image representations (e.g., thumbnails) representing the identified primary images. The search result page is transmitted to client device 102, which is a mobile device in this example. A user of client device 102 can interact with any of the image representations listed in the search result page. When the user clicks on an image representation, the user enters a search detail page. In response to entering the search detail page, an enlarged version or full image corresponding to the clicked image representation is retrieved server 104. The image is transmitted from server 104 to client device 101 and displayed on mobile device 101 as part of a search detail page. Due to the nature of a limited display area of the mobile device, images are typically displayed in sequence one at a time. The user can back and forth by swipe from right to left, or vice versa.

The user interactions with the search result page and the search detail page may be captured and recorded in user data server 150. The recorded user data may include session data of the current and prior browsing sessions of users, user profiles of the users, and history logs logging user interactions of the users, etc. User data server 150 may be operated by a different organization or entity. Alternatively, user data server 150 may be operated by the same organization or entity associated with server 104. Furthermore, user data server 150 may be integrated with server 104.

According to one embodiment, once the user enters the search detail page, the images are delivered to mobile device 102 in a feed based or feed-like based manner. For example, when the user clicks on a particular image representation, a signal representing the user interaction is transmitted back to server 104. Based on the signal, an image ID identifying the corresponding image is determined and the image is retrieved, rendered, and transmitted to client device 102. In addition, certain images in the search result page, which are positioned within a proximity of the clicked image in sequence, may also be retrieved (e.g., prefetched), rendered, and transmitted to mobile device 102. As a result, the user can swipe (e.g., from right to left or vice versa) from the initial clicked image to view a next image or a previous image in sequence, one at a time. Dependent upon how fast the user swipes and how long the user stays with a particular image, additional images are searched, rendered, and delivered by server 104 in real time, referred to herein as a feed-based image delivery.

According to one embodiment, a first image identifier (ID) is received identifying a first of a first set of images, where the first image is currently displayed at a mobile device of a user. The first set of images may be identified by search engine 120 and/or image selection module 110 in response to a search query for images. The first set of images may represent a first portion of a search detail page that has been delivered to the mobile device. In response to the first image ID, a number of additional images the user likely accesses from the first image in sequence is determined based on user interactions within a current browsing session and user interactions of a prior browsing session associated with the user. A second set of images are identified based on the number of additional images the user likely accesses. The second set of images may represent a second portion of the search detail page. A sequential order is determined based on rankings of the images in the second set in view of a set of image selection rules. The second set of images is transmitted to the mobile device to be displayed on the mobile device in sequence one at a time. Each of the first and second set of images may include some primary images mixed with some auxiliary images in sequence.

According to one embodiment, in addition to the primary images that are searched and obtained from primary content database 130 as part of the feed-based images, search engine 120 or image selection system 110 may search and identify certain auxiliary images from auxiliary content database 131 based on the keywords associated with the original search query that is used to search and obtain primary images. The auxiliary images are identified, ranked, and selected by image selection system 110 based on user interactions of the current browsing session and prior user interactions of prior browsing sessions, using a set of ranking methods (e.g., ranking rules and/or ranking models). At least some of the auxiliary images are special-purpose images or sponsored images provided by some sponsors. The auxiliary images are then mixed with the primary images to form an integrated list of intertwined primary and auxiliary images in sequence. The integrated list of primary and auxiliary images is then transmitted to client device 102 to be displayed therein in sequence one at a time, as part of the feed-based image delivery.

According to one embodiment, in response to detecting that a user interacts with a particular image, image selection system 110 determines or predicts a number of additional images that the user likely accesses from the currently interacted image based on the user interactions during the current browsing session, user interactions of prior browsing sessions, and/or the user profile of the user, which may be provided by user data server or system 150. Based on the determine number of images the user likely accesses, proper amount of additional primary images and auxiliary images are determined and rendered to form the integrated list. The auxiliary images may be those the user is likely interested in receiving based on the user interactions during the current browsing session, user interactions of prior browsing sessions, and/or the user profile of the user, as well as the primary images resulted from the searches. The auxiliary images may be ranked and selected using a set of ranking rules and/or one or more ranking models, which will be described further below.

Note that the configuration of server 104 has been described for the purpose of illustration only. Server 104 may be a Web server to provide a frontend search service to a variety of end user devices. Alternatively server 104 may be an application server or backend server that provides specific or special content search services to a frontend server (e.g., Web server or a general content server. Image selection module or system 150 may also be implemented as a separate server, which is responsible for searching, ranking, and selecting auxiliary images.

Other architectures or configurations may also be applicable. For example, as shown in FIG. 1B, content database 133 may be maintained and hosted in a separate server as a content server over a network. Server 133 may be a Web server, an application server, or a backend server. Content server 133 may be organized and provided by the same entity or organization as of server 104. Alternatively, content server 133 may be maintained or hosted by separate entities or organizations (e.g., third-party providers), which are responsible for collecting contents in content databases 130-131 and their metadata. Also note that content database/server 133 may include primary content database 130 and auxiliary content database 131. Primary content database 130 may also be implemented or maintained in a separate content server, referred to as a primary content server. Similarly, auxiliary content database 131 may be implemented or maintained in a separate content sever, referred to as an auxiliary content server.

Figure 2:
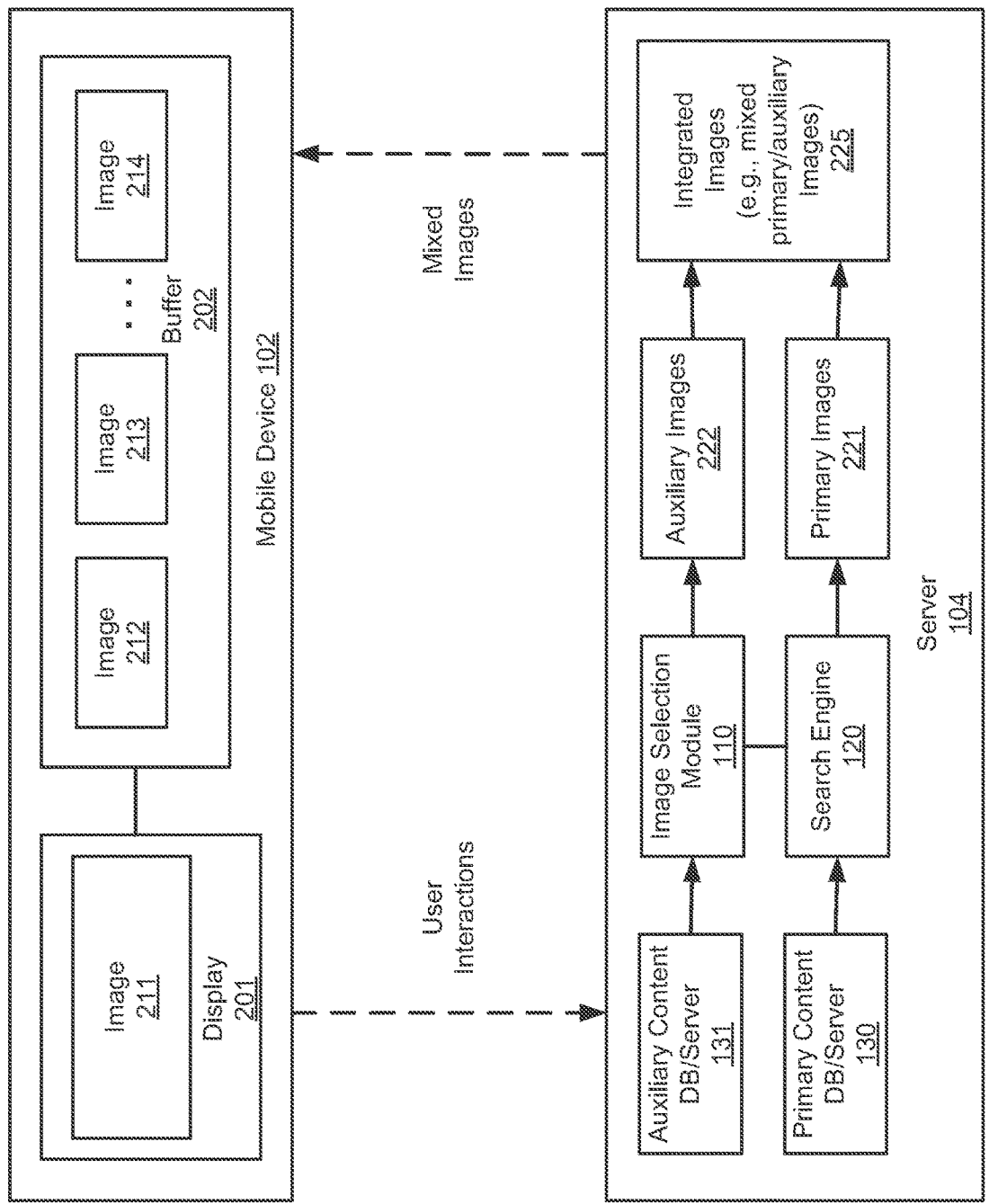
FIG. 2 is a block diagram illustrating an example of an image selection system according to one embodiment of the invention.

FIG. 2 is a block diagram illustrating a feed-based image delivery mechanism according to one embodiment of the invention. Referring to FIG. 2, in this example, it is assumed that a search result page has been generated and delivered to mobile device 102 in response to a search query and a user of mobile device 102 clicks one of the image representations in the search result page, which causes image 211 is displayed at display device 201 of mobile device 102, while additional small amount of images 212-214 are also delivered and temporarily stored in buffer or memory 202 of mobile device 102 (e.g., a first set of images). Images 211-214 may be mixed primary images 221 and auxiliary images 222 that are searched and rendered by search engine 120 and image selection module 110 as described above. When the user swipes left and right to access a next or previous image in sequence with respect to the image currently displayed (e.g., image 211), the user interaction is captured and transmitted back to server 104. In response, additional primary images 221 and/or auxiliary images 222 (e.g., a second set of images) are dynamically searched, rendered, mixed to generate mixed images 225, which are delivered to mobile device 102 based on a prediction regarding a number of additional images the user likely accesses from the currently displayed image. The number of images the user likely accesses may be determined based on the user interaction of the current and prior browsing sessions and the user profile of the user.

Figure 3:
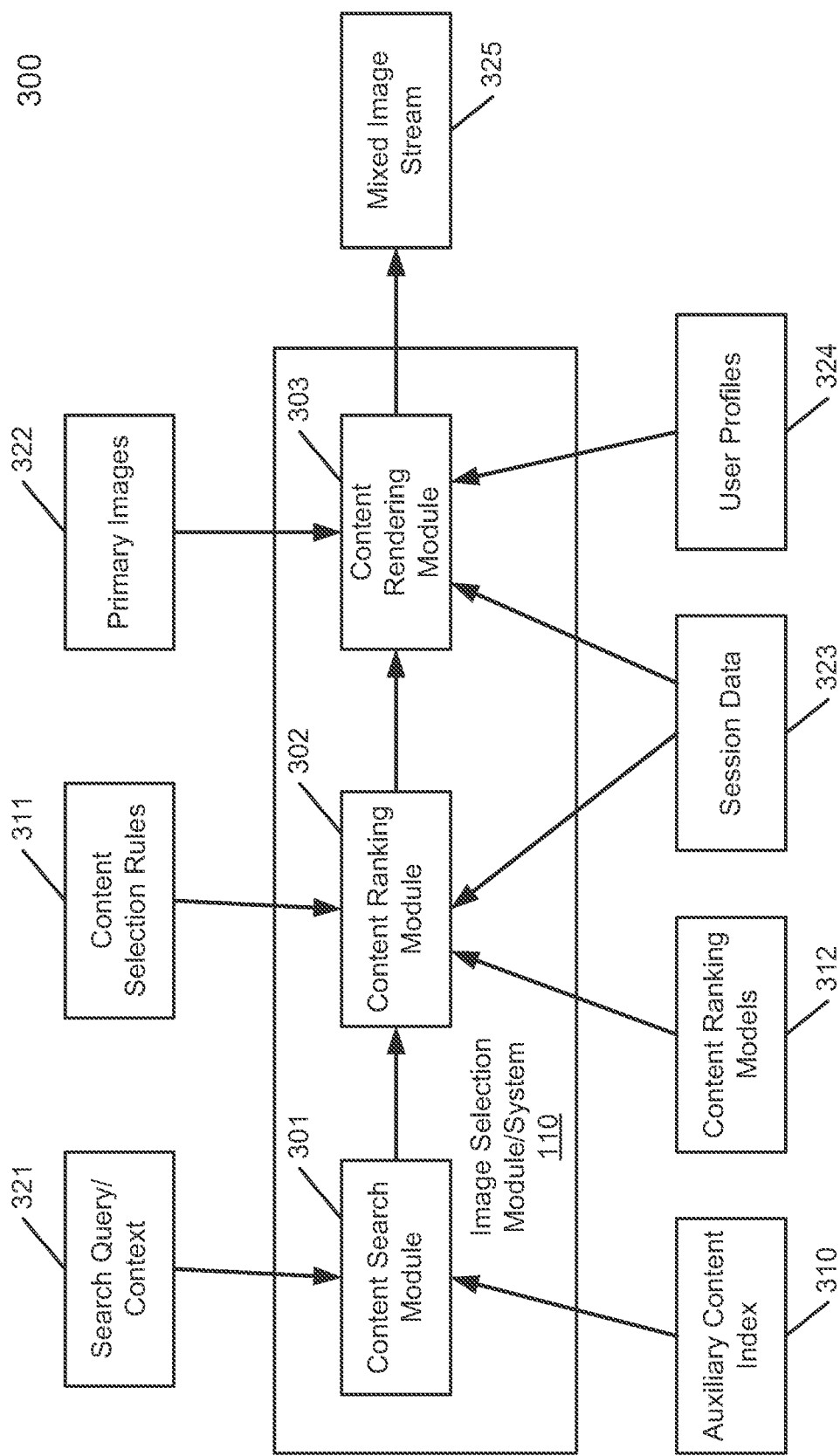
FIG. 3 is a block diagram illustrating an example of an image selection system according to one embodiment of the invention.

FIG. 3 is a block diagram illustrating an example of an image selection system according to one embodiment of the invention. For example, image selection system 300 may represent an image selection system as shown in FIG. 1. Referring to FIG. 3, system 300 includes image selection module 110, which includes, but is not limited, content search module 301, content ranking module 302, and content rendering module 303. In one embodiment, content search module 301 receives search context 321 having context information of a search query, for example, from search engine 120. The search context 321 includes the search query initially received from a mobile device of a user, as well as information surrounding the search query, such as, for example, a user ID identifying the user (e.g., username), a device ID identifying the mobile device (e.g., IP or MAC address of the mobile device), the original search query, one or more keywords associated with the search query (e.g., original keywords extracted from the search query or semantically related to the original keywords), etc. Some of the context information may be provided as part of session data 323 associated with the current browsing session.

Based on the search context 321, content search module 301 searches in auxiliary content index 310 to identify a list of auxiliary images as auxiliary image candidates. Auxiliary content index 310 may store indexing information for auxiliary content database 131 or alternatively, auxiliary content index 310 may be part of auxiliary content database 131. The auxiliary images are then ranked by content ranking module 302 using one or more content ranking models 312 associated with the user and one or more content selection rules 311 (also referred to as content ranking rules).

Content ranking models 312 may be trained based on prior user interactions of the user with respect to the same or similar images in the past. Content ranking models 312 may rank the images based on various criteria, such as, for example, cost per million (CPM), cost per action (CPA), and/or cost per click (CPC) models. Content ranking models 312 may determine one or more ranking scores for one or more attributes or parameters associated with the images (e.g., quality of the images, prior user interactions with the images with the same or similar users). The rankings may be performed in view of session data 323 of the current browsing session and user profile 324 of the user. Session data 323 and user profiles 324 may be provided by a session data server (e.g., user data server 150). The session data 323 includes how many pages the user has already accessed, how fast the user the user has been swiping, and how much time the user stays at a search detail page, etc. User profile 324 may be compiled based on prior user interaction behavior. User profile 324 also includes information describing the general swiping and browsing behavior of the user given certain queries and context. As a result, the system can relatively accurately estimate how deep and how fast a user will swipe and browse given a sequence of search detail page.

Figure 4:
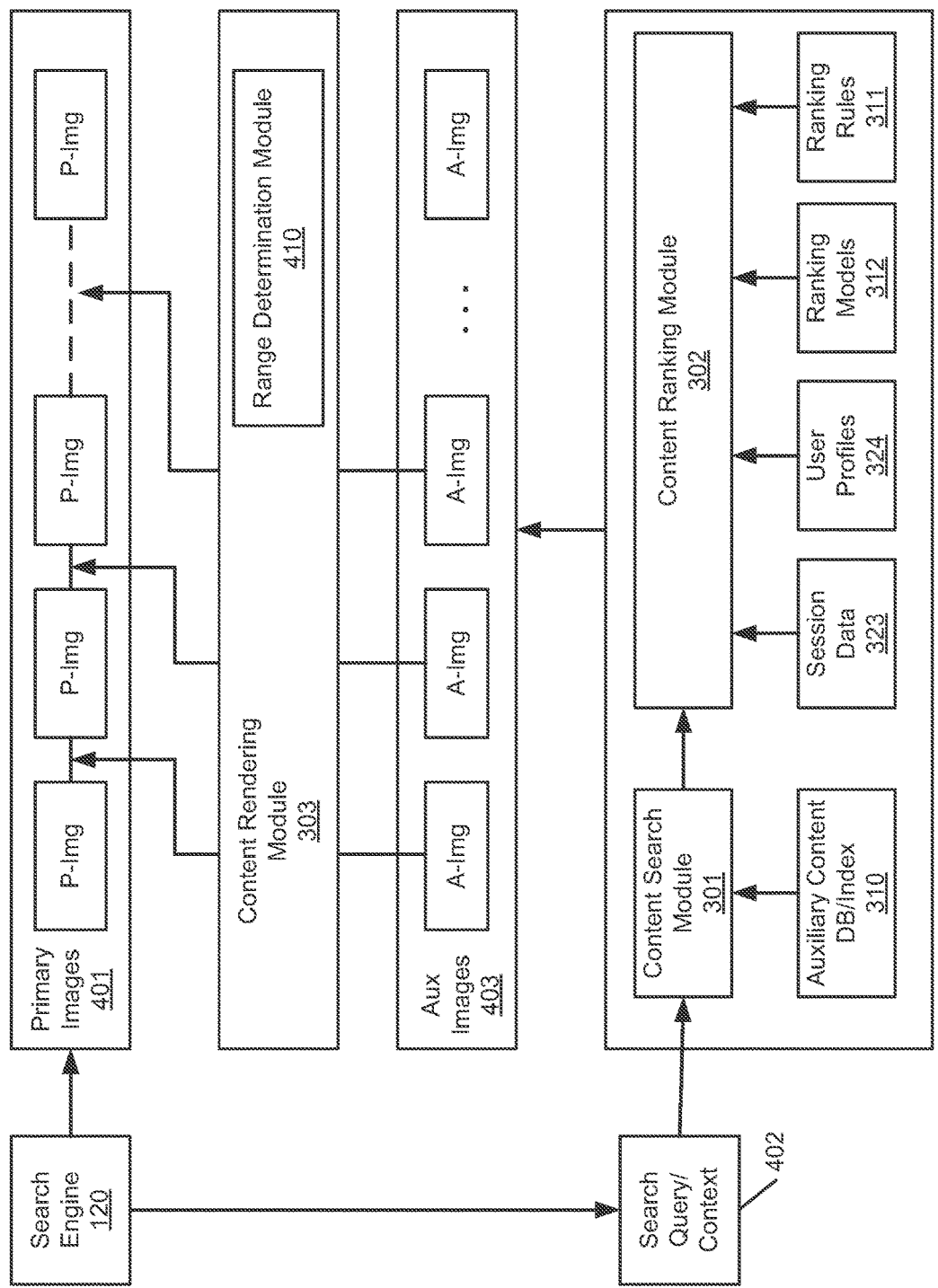
FIG. 4 is a block diagram illustrating an example of an image selection process according to one embodiment of the invention.

Content selection rules 311 includes rules defining how the images should be ranked, for example, using some or all of the ranking scores calculated by content ranking models 312. Thus, content ranking models 312 are utilized to calculate individual ranking scores for individual criteria, while content selection rules 311 are utilized to determine how those scores are utilized in determining the final scores, which determine the sequential positions within the final sequence of images. The auxiliary images together with ranking information and/or sequential positioning information are sent to content rendering module 303. In response, content rendering module 303 mixes the auxiliary images with primary images 322, which may be provided by search engine 120. Content rendering module 303 mixes by inserting one or more auxiliary images at various positions between primary images 322 according to the ranking and positioning information provided by ranking module 302, as shown in FIG. 4. Note that some or all of the components as shown in FIG. 3 may be implemented in hardware (e.g. circuitry, dedicated logic, etc.), software (e.g., embodied on a non-transitory computer readable medium), or a combination thereof.

FIG. 4 is a block diagram illustrating a processing flow of searching images according to one embodiment of the invention. Referring to FIG. 4, in response to a search query, search engine 120 searches and identifies a set of primary images 401. In addition, search engine 120 sends search query context 402 to content search module 301 of the image selection system as described above. Based on the search query context 402, content search module 301 searches auxiliary content database or index 310 to identify a set of auxiliary images 403 as auxiliary image candidates. The auxiliary images are ranked by content ranking module 302 based on session data 321, user profile 323 of the user, ranking models associated with the user, and a set of ranking rules. As a result, auxiliary images 403 are provided with ranking information and the placement or mixing positions between primary images 401. Content rendering module 303 then mixes at least a portion of auxiliary images 403 with primary images 401 at the specified placement or mixing positions. In one embodiment, range determination module 410 is to determine or predict a range representing a number of images the user likely accesses based on the user interactions or behavior of the current browsing session and prior browsing sessions. Some or all of the mixed images are then selected based on the determined range and the selected mixed images are then transmitted to the mobile device of the user as part of a search detail page, i.e., a continued detail page similar to a feed-based or feed like based manner.

FIG. 5 is a block diagram illustrating an example of image selection rules according to one embodiment of the invention. Rules 500 may represent rules 311 of FIG. 3. Referring to FIG. 5, in this example, rule 501 specifies that amongst the images of type 1, a top ranked image will be selected and placed at the beginning of the sequence of images. Rule 502 specifies that amongst the images of type 2, a top ranked image will be selected and placed at the end of the sequence of images. Similarly, rule 503 specifies other images with different rankings to be placed at different positions in the sequence of images. As shown in FIG. 5, rules 500 may be written using a domain-specific language, such as scripts that are understandable by users and the ranking module, which may be periodically updated and downloaded into the system by an administrator. Rules 500 are mainly used to determine the positioning information for different types of images with different rankings, where the rankings may be determined by one or more ranking models associated with a particular user or users.

Figure 6:
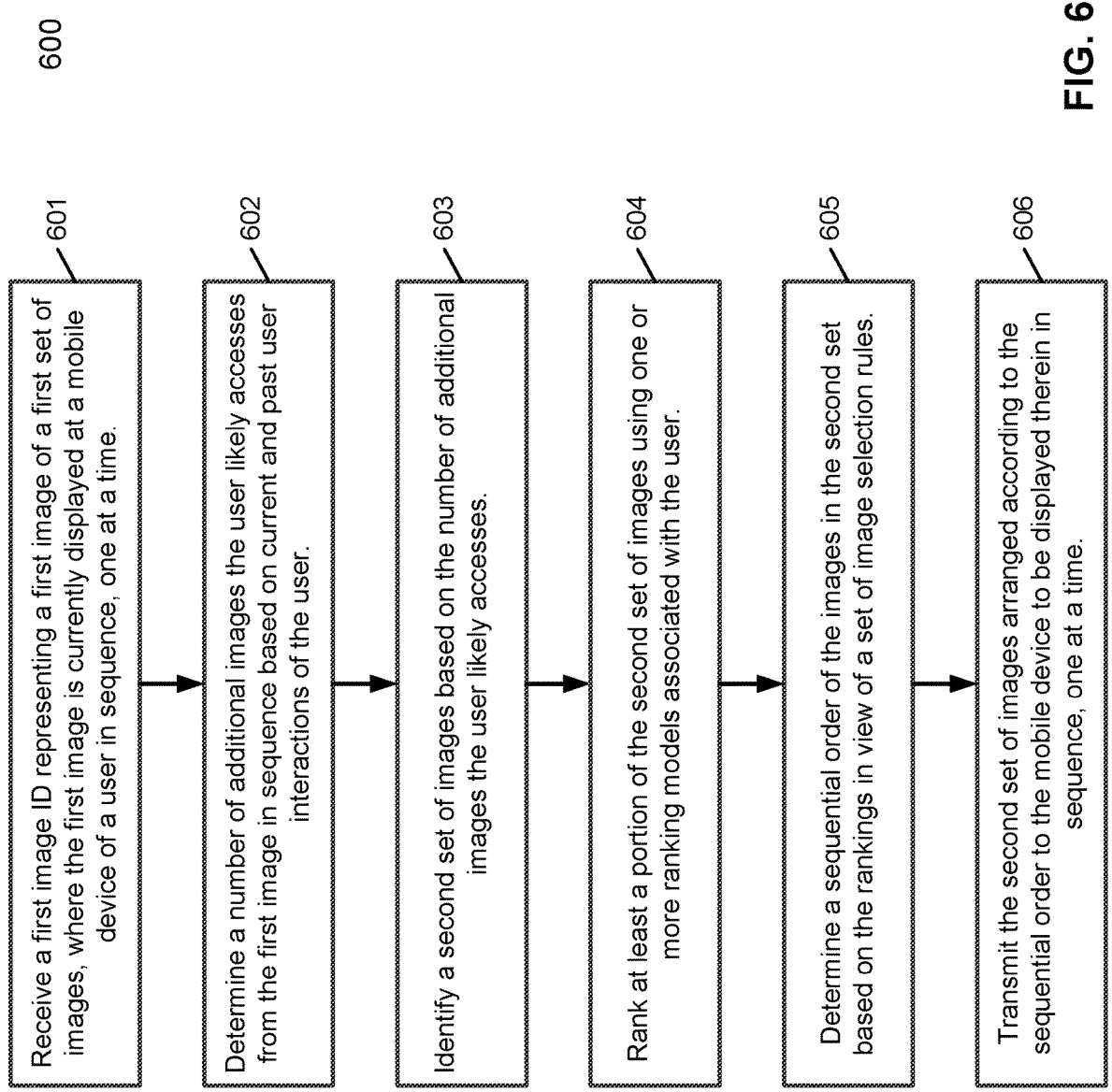
FIG. 6 is a flow diagram illustrating a process of search images according to one embodiment of the invention.

FIG. 6 is a flow diagram illustrating a process of search images according to one embodiment of the invention. Process 600 may be performed by processing logic that includes hardware (e.g. circuitry, dedicated logic, etc.), software (e.g., embodied on a non-transitory computer readable medium), or a combination thereof. For example, process 600 may be performed by system 300 of FIG. 3. Referring to FIG. 6, at block 601, processing logic receives a first image ID representing a first image of a first set of images. The first image is currently displayed in sequence, one at a time, at a mobile device of a user. The first set of images may be obtained and transmitted to the mobile device as part of a search detail page in response to a user interaction to a search result page. The search result page may be generated in response to a search query for searching images. The search result page may include a list of image or graphical representations (e.g., thumbnails) representing the images as a result of the search.

In response to the first image ID, at block 602, processing logic determines a number of additional images that the user likely accesses from the first image sequentially based on user interactions of the current browsing session and user interactions of prior browsing sessions associated with the user. The purpose is to estimate how many images the user typically accesses in response to a stream or sequence of images as a search result, such that a proper amount of additional images can be prepared to cover user's intention without having to waste processing resources or network bandwidth. For example, if the user typically will access 8 images in sequence in average, preparing 4 additional images may not be sufficient, while preparing 20 additional images may waste resources because the user may not reach those images.

At block 603, processing logic searches and identifies a second set of images based on the determined number of additional images the user likely accesses. That is, the number of images included in the second set may be optimized based on the predicted number of images the user likely accesses. At block 604, at least a portion of the second set of images are ranked using one or more ranking models associated with the user. The ranking models may be generated and trained based on the prior user interactions of the user with respect to the same or similar images, the user profile of the user, and other information concerning the user (e.g., history log of the user). One or more ranking scores may be calculated for some predetermined criteria (e.g., CPM, CPA, and CPC). These scores may represent a relevancy degree between the user and the images, which in turn represent whether the user is likely interested in seeing the images.

At block 605, a sequential order of the images (e.g., positions in sequence of images) is determined based on the rankings of the images. Some of the images may be sponsored images that are sponsored by certain sponsors and they may be positioned in an earlier position in the sequence such that the user will more likely reach and view the images. A final sequence of images with determined sequential order is generated as a result. At block 606, the final sequence of the ordered images is then transmitted to the mobile device of the user, where the ordered images are displayed at the mobile device in sequence, one at a time in response to a user action (e.g., a swiping action).

Figure 7A:
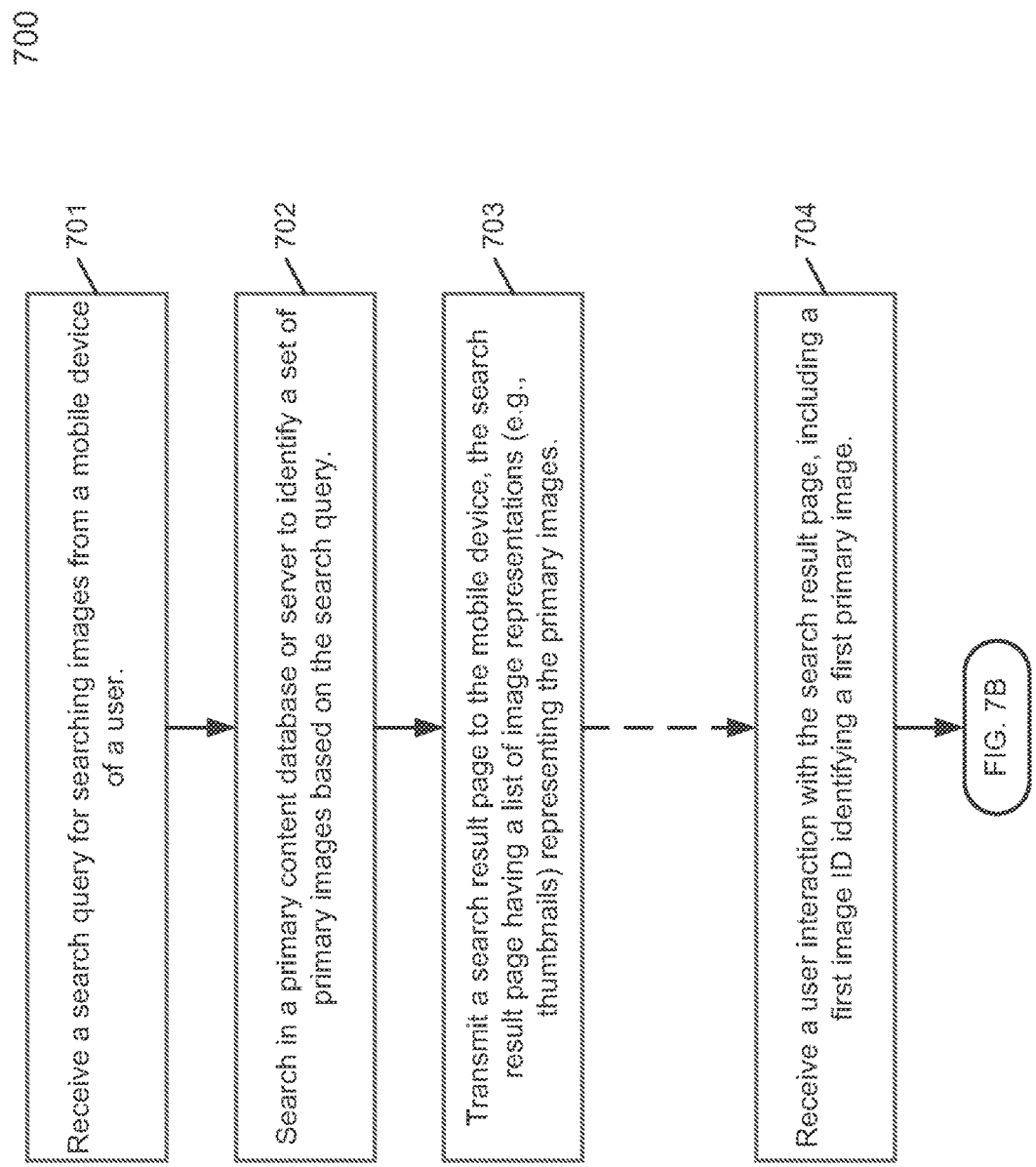
FIGS. 7A-7B are flow diagrams illustrating a process of search images according to another embodiment of the invention.
Figure 7B:
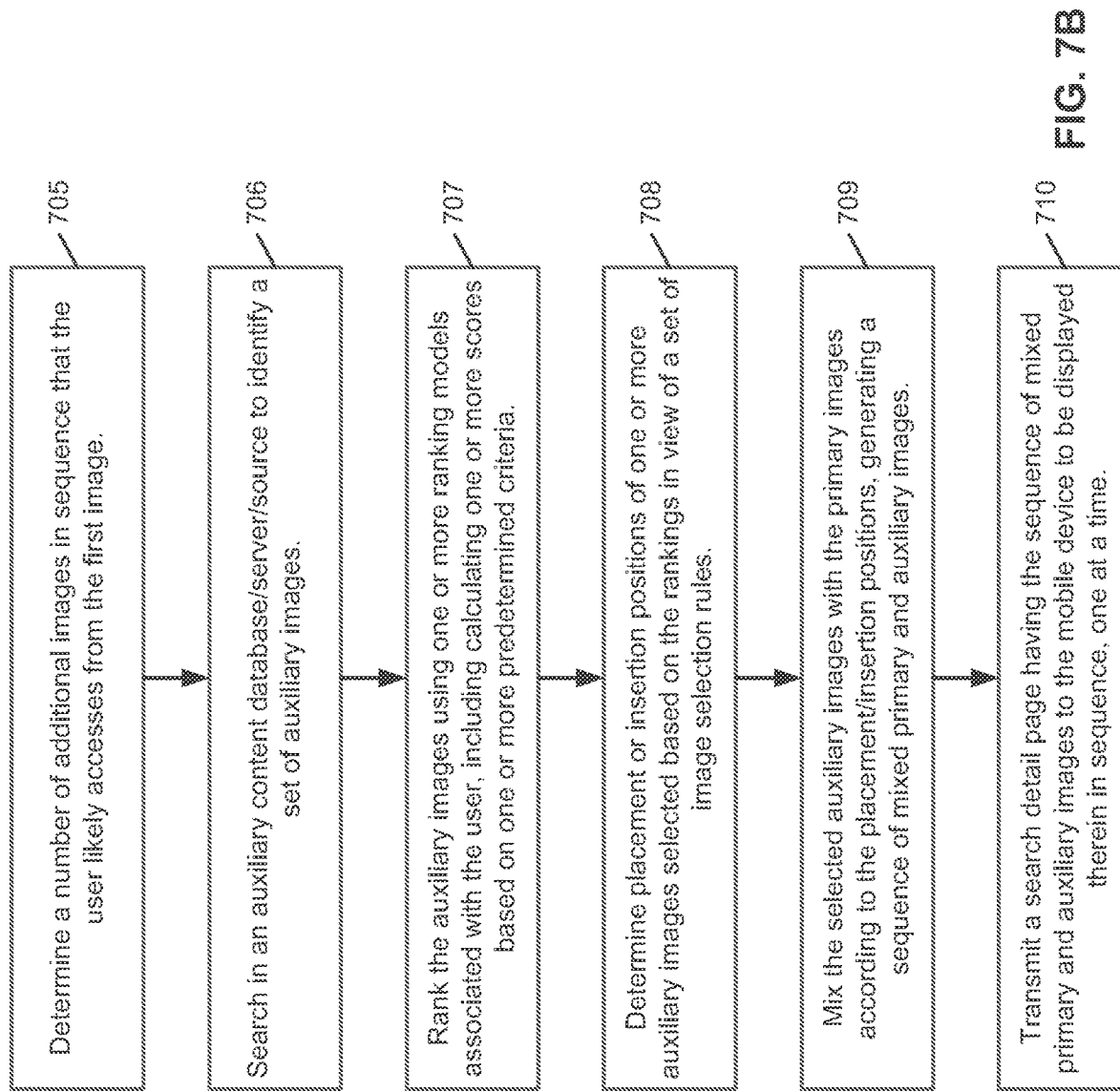

FIGS. 7A-7B are flow diagrams illustrating a process of search images according to another embodiment of the invention. Process 700 may be performed by processing logic that includes hardware (e.g. circuitry, dedicated logic, etc.), software (e.g., embodied on a non-transitory computer readable medium), or a combination thereof. For example, process 700 may be performed by system 300 of FIG. 3 or system 400 of FIG. 4. Referring to FIG. 7A, at block 701, processing logic receives a search query for searching images from a mobile device of a user. In response to the search query, at block 702, processing logic searches in one or more primary content databases or primary image sources to identify a set of primary images based on the search query. At block 703, a search result page is generated and transmitted to the mobile device to be displayed therein. The search result page includes a list of image or graphical representations (e.g., thumbnails) representing the primary images.

Subsequently at block 704, processing logic receives a user interaction with the search result page, including a first image ID identifying a first image represented by a first image representation interacted from the search result page. At block 705, referring now to FIG. 7B, processing logic determines or predicts a number of additional images that the user likely accesses from the first image based on user interactions of a current browsing session and user interactions of prior browsing sessions associated with the user. At block 706, processing logic searches in one or more auxiliary content databases or image sources to identifying a list of auxiliary images as auxiliary image candidates. At block 707, the auxiliary image candidates are ranked using one or more ranking models associated with the user, including calculating one or more ranking scores for one or more predetermined criteria (e.g., CPM, CPA, or CPC).

At block 708, processing logic determines placement positions (e.g., sequential positions) for one or more auxiliary images that are selected from the auxiliary image candidates based on the rankings in view of a set of image selection rules. At block 709, the selected auxiliary images are mixed with the primary images in sequence according to the determined placement positions, generating a sequence of mixed primary images and auxiliary images. At block 710, a search detail page is transmitted to the mobile device, where the search detail page includes the sequence of mixed primary and auxiliary images to be displayed at the mobile device in sequence, one at a time.

The techniques described above can be applied to searching images mixed with sponsored images. One type of the sponsored images is advertisement (Ads). For example, referring back to FIGS. 1A-1B, content database/server 130 may be general image database/server, while auxiliary database/server 131 may be an Ads database or Ads server. In another embodiment, primary content DB 130 may store the general content generally available in a public network. Auxiliary content DB 131 may be an Ads DB. Server 104 may be a Web server for searching content or alternatively, server 104 may be an Ads server. Also note that the techniques described above can also be applied to content items other than images.

Figure 8:
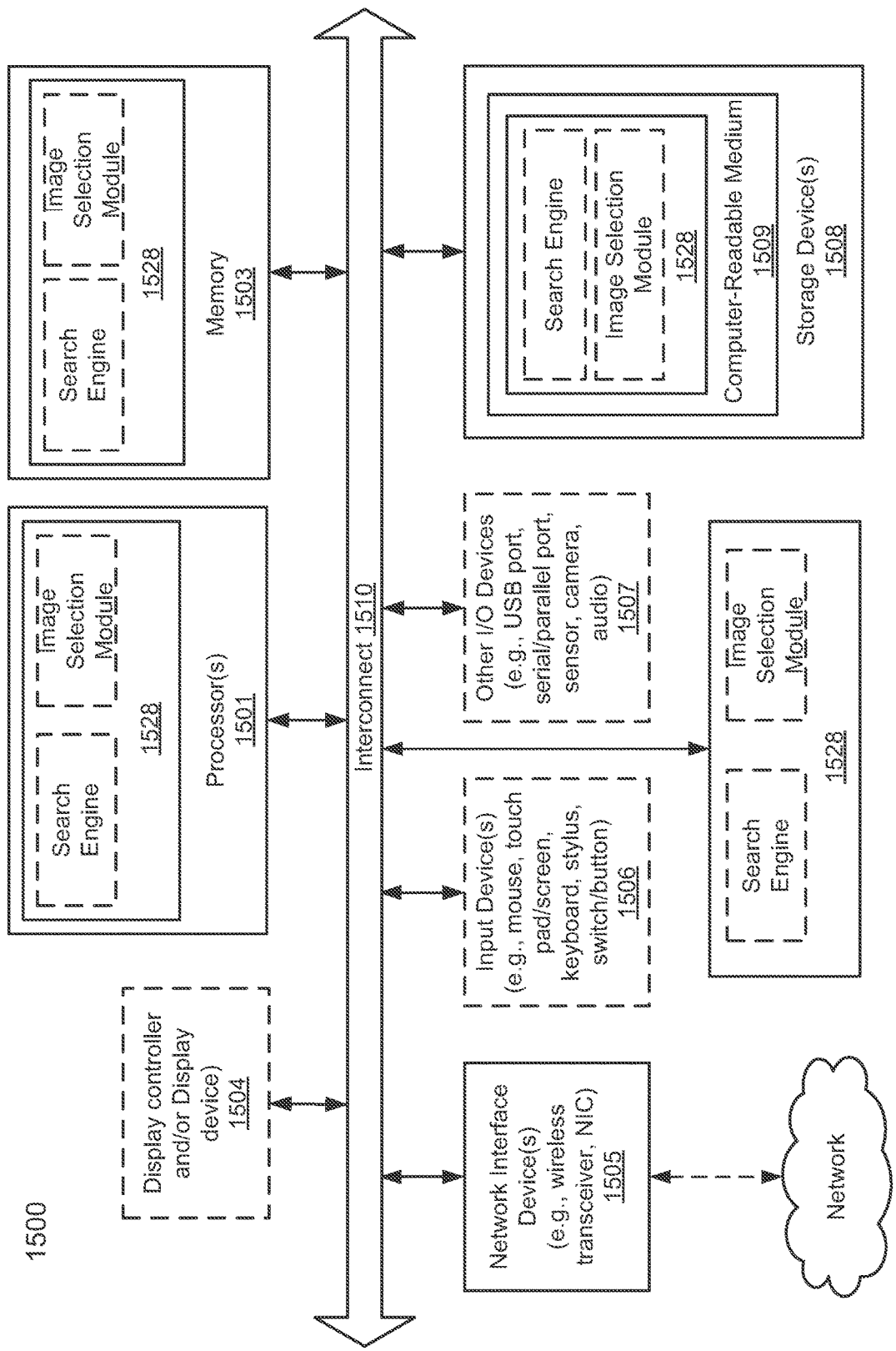
FIG. 8 is a block diagram illustrating a data processing system according to one embodiment.

FIG. 8 is a block diagram illustrating an example of a data processing system which may be used with one embodiment of the invention. For example, system 1500 may represents any of data processing systems described above performing any of the processes or methods described above, such as, for example, a client device or a server described above, such as, for example, server 104, content server 133, as described above.

System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may represent any of the components described above, such as, for example, a search engine, an encoder, an interaction logging module as described above. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques shown in the figures can be implemented using code and data stored and executed on one or more electronic devices. Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable transmission media (e.g., electrical, optical, acoustical or other form of propagated signals—such as carrier waves, infrared signals, digital signals).

The processes or methods depicted in the preceding figures may be performed by processing logic that comprises hardware (e.g. circuitry, dedicated logic, etc.), firmware, software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for searching images for mobile devices, the method comprising:
receiving a first image identifier (ID) identifying a first image of a first set of images, the first image being currently displayed at a mobile device of a user;
generating a prediction representing a quantity of additional images the user is to access from the first image in a sequence based on behaviors of the user derived from interactions of the user with the first set of images in a current browsing session associated with the user and interactions of the user with images in one or more prior browsing sessions associated with the user, the behaviors of the user comprising an average number of images the user accesses in a sequence, a speed at which the user swipes through images in the sequence, and a length of time for which the user stays on and views each of the images in the sequence;
identifying a second set of images based on the prediction representing the quantity of additional images the user is to access, wherein the second set of images includes a set of primary images and a set of auxiliary images mixed together;
determining a sequential order of the images of the second set based on a ranking score for each of the images of the second set in view of a set of image selection rules, wherein the ranking score for each image represents a relevancy degree between the image and the user, and is generated using a ranking model for the user, wherein at least one of the set of image selection rules specifies a placement position between two primary images of the set of primary images for a particular type of auxiliary image having a ranking score that is greater than a predetermined threshold; and
transmitting the second set of images to the mobile device to be displayed on the mobile device in sequence one at a time after the user views each of the first set of images.

2. The method of claim 1, further comprising:
in response to a search query received from the mobile device, searching in a content database to identify the first set of images;
generating a search result page having a plurality of image representations, each image representation representing one of the images in the first set; and
transmitting the search result page to the mobile device to be displayed therein, wherein the first image ID is received in response to a user interaction with the search result page from the mobile device.

3. The method of claim 2, wherein the first set of images was transmitted to the mobile device as part of a search detail page in response to the user interaction with the search result page.

4. The method of claim 1, further comprising:
ranking at least a portion of the second set of images using an image ranking model associated with the user; and
serializing the second set of images into a sequence of images according to the determined sequential order, wherein the sequential order is determined based on the ranking scores of the images.

5. The method of claim 4, wherein the set of image selection rules was written using a predetermined domain-specific language specifically designed for image searching.

6. The method of claim 4, wherein the set of image selection rules specifies a sequential position of an image within the sequence of images based on a ranking score of the image and a type of the image.

7. The method of claim 4, wherein the image ranking model was generated and trained based on prior user interactions of the user during prior browsing sessions with respect to similar images.

8. The method of claim 4, further comprising:
searching in a primary content database to obtain the set of primary images;
searching in an auxiliary content database to obtain the set of auxiliary images;
ranking the auxiliary images using the image ranking model associated with the user; and
mixing one or more of the auxiliary images with the primary images at one or more sequential positions based on the rankings of the auxiliary images to generate the second set of images.

9. A non-transitory machine-readable medium having instructions stored therein, which when executed by a processor, cause the processor to perform operations of searching images, the operations comprising:

receiving a first image identifier (ID) identifying a first image of a first set of images, the first image being currently displayed at a mobile device of a user;

generating a prediction representing a quantity of additional images the user is to access from the first image in a sequence based on behaviors of the user derived from interactions of the user with the first set of images in a current browsing session associated with the user and interactions of the user with images in one or more prior browsing sessions associated with the user, the behaviors of the user comprising an average number of images the user accesses in a sequence, a speed at which the user swipes through images in the sequence, and a length of time for which the user stays on and views each of the images in the sequence;

identifying a second set of images based on the prediction representing the quantity of additional images the user is to access, wherein the second set of images includes a set of primary images and a set of auxiliary images mixed together;

determining a sequential order of the images of the second set based on a ranking score for each of the images of the second set in view of a set of image selection rules, wherein the ranking score for each image represents a relevancy degree between the image and the user, and is venerated using a ranking, model for the user, wherein at least one of the set of image selection rules specifies a placement position between two primary images of the set of primary images for a particular type of auxiliary image having a ranking score that is greater than a predetermined threshold; and transmitting the second set of images to the mobile device to be displayed on the mobile device in sequence one at a time after the user views each of the first set of images.

10. The non-transitory machine-readable medium of claim 9, wherein the operations further comprise:

in response to a search query received from the mobile device, searching in a content database to identify the first set of images;

generating a search result page having a plurality of image representations, each image representation representing one of the images in the first set; and transmitting the search result page to the mobile device to be displayed therein, wherein the first image ID is received in response to a user interaction with the search result page from the mobile device.

11. The non-transitory machine-readable medium of claim 10, wherein the first set of images was transmitted to the mobile device as part of a search detail page in response to the user interaction with the search result page.

12. The non-transitory machine-readable medium of claim 9, wherein the operations further comprise:

ranking at least a portion of the second set of images using an image ranking model associated with the user; and serializing the second set of images into a sequence of images according to the determined sequential order, wherein the sequential order is determined based on the ranking scores of the images.

13. The non-transitory machine-readable medium of claim 12, wherein the set of image selection rules was written using a predetermined domain-specific language specifically designed for image searching.

14. The non-transitory machine-readable medium of claim 12, wherein the set of image selection rules specifies a sequential position of an image within the sequence of images based on a ranking score of the image and a type of the image.

15. The non-transitory machine-readable medium of claim 12, wherein the image ranking model was generated and trained based on prior user interactions of the user during prior browsing sessions with respect to similar images.

16. The non-transitory machine-readable medium of claim 12, wherein the operations further comprise:

searching in a primary content database to obtain the set of primary images;

searching in an auxiliary content database to obtain the set of auxiliary images;

ranking the auxiliary images using the image ranking model associated with the user; and mixing one or more of the auxiliary images with the primary images at one or more sequential positions based on the rankings of the auxiliary images to generate the second set of images.

17. The non-transitory machine-readable medium of claim 16, wherein at least one of the image selection rules specifies a placement position between two primary images for a particular type of an auxiliary image having a ranking score that is greater than a predetermined threshold.

18. A data processing system for searching images for mobile devices, the system comprising:

a processor; and a memory coupled to the processor for storing instructions, which when executed by the processor, cause the processor to perform operations of searching images, the operations including receiving a first image identifier (ID) identifying a first image of a first set of images, the first image being currently displayed at a mobile device of a user, generating a prediction representing a quantity of additional images the user is to access from the first image in a sequence based on behaviors of the user derived from interactions of the user with the first set of images in a current browsing session associated with the user and interactions of the user with images in one or more prior browsing sessions associated with the user, the behaviors of the user comprising an average number of images the user accesses in a sequence, a speed at which the user swipes through images in the sequence, and a length of time for which the user stays on and views each of the images in the sequence, identifying a second set of images based on the prediction representing the quantity of additional images the user is to access, wherein the second set of images includes a set of primary images and a set of auxiliary images mixed together, determining a sequential order of the images of the second set based on a ranking score for each of the images of the second set in view of a set of image selection rules, wherein the ranking score for each image represents a relevancy degree between the image and the user, and is generated using a ranking model for the user, wherein at least one of the set of image selection rules specifies a placement position between two primary images of the set of primary images for a particular type of auxiliary image having a ranking score that is greater than a predetermined threshold, and transmitting the second set of images to the mobile device to be displayed on the mobile device in sequence one at a time after the user views each of the first set of images.

19. The system of claim 18, wherein the operations further comprise:
in response to a search query received from the mobile device, searching in a content database to identify the first set of images;
generating a search result page having a plurality of image representations, each image representation representing one of the images in the first set; and
transmitting the search result page to the mobile device to be displayed therein, wherein the first image ID is received in response to a user interaction with the search result page from the mobile device.

20. The system of claim 19, wherein the first set of images was transmitted to the mobile device as part of a search detail page in response to the user interaction with the search result page.

21. The system of claim 18, wherein the operations further comprise:
ranking at least a portion of the second set of images using an image ranking model associated with the user; and
serializing the second set of images into a sequence of images according to the determined sequential order, wherein the sequential order is determined based on the ranking scores of the images.

22. The system of claim 21, wherein the set of image selection rules was written using a predetermined domain-specific language specifically designed for image searching.

23. The system of claim 21, wherein the set of image selection rules specifies a sequential position of an image within the sequence of images based on a ranking score of the image and a type of the image.

24. The system of claim 21, wherein the image ranking model was generated and trained based on prior user interactions of the user during prior browsing sessions with respect to similar images.

25. The system of claim 21, wherein the operations further comprise:
searching in a primary content database to obtain the set of primary images;
searching in an auxiliary content database to obtain the set of auxiliary images;
ranking the auxiliary images using the image ranking model associated with the user; and
mixing one or more of the auxiliary images with the primary images at one or more sequential positions based on the rankings of the auxiliary images to generate the second set of images.

26. The system of claim 25, wherein at least one of the image selection rules specifies a placement position between two primary images for a particular type of an auxiliary image having a ranking score that is greater than a predetermined threshold.

* * * * *